Nov. 30, 1926.

M. L. STEVENSON

FISHING TACKLE

Filed Nov. 28, 1924

1,608,631

INVENTOR
Marcus L. Stevenson
BY
John W. Maupin.
ATTORNEY

Patented Nov. 30, 1926.

1,608,631

UNITED STATES PATENT OFFICE.

MARCUS L. STEVENSON, OF SEATTLE, WASHINGTON.

FISHING TACKLE.

Application filed November 28, 1924. Serial No. 752,790.

This invention relates to fishing tackle that is used with hand lines, with pole and line, or towed through the water, and is especially adapted for use in fishing for large game fish. The primary objects of the invention are to provide a tackle having bait hooks at which the fish may strike, with or without a metal spoon, and also to provide a simple and efficient construction whereby the fish are automatically held on the line after they strike.

With the above and other objects in view which will appear as the description proceeds, the invention consists of the novel construction, adaptation, arrangement and combination of parts hereinafter described and claimed. These objects are accomplished by devices illustrated in the accompanying drawings; wherein:—

Figure 1:
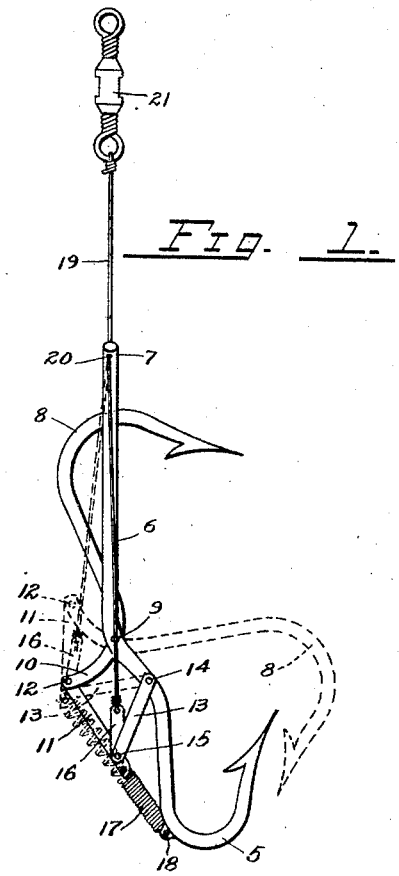
Figure 1 is a view in side elevation of the preferred form of the invention showing the parts in their relative position for being towed through the water, and showing in dotted lines the disposition of the parts after the fish strikes.
Figure 2:
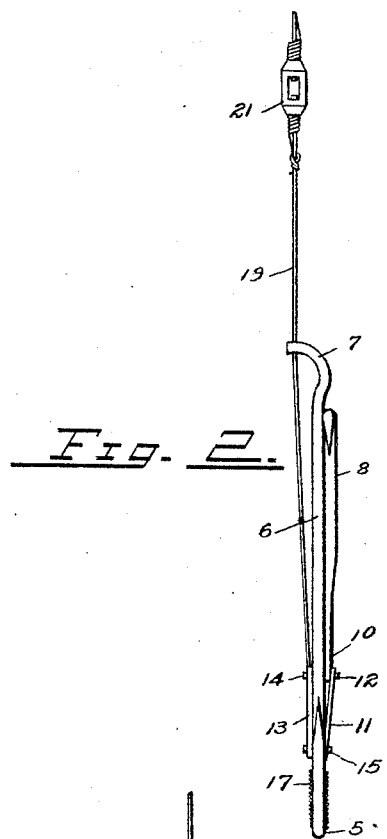
Fig. 2 is a view in front elevation of the same.

Referring to the drawings throughout which like reference numerals designate like parts, and more particularly to the preferred form shown in Figs. 1 and 2, the numeral 5 indicates the bait hook on which the fish is primarily caught. Said hook is joined by a compound curve to an upright shank 6 which is curved outwardly at its upward extremity as at 7.

A jig hook 8 is pivotally connected at 9 to the bait hook 5 and its opposite end is curved outwardly as at 10. A flat link 11 is pivotally secured at 12 to the end 10, and a similar link 13 is pivoted at 14 to the hook 5. The opposite ends of said links are pivoted together at 15 with a short link 16 interposed for reasons presently described.

The links 11, 13 and 16 collectively form a toggle system whereby a spring 17, secured at its upper end to the lower extremity of the link 11 and at its lower end to a lug 18 on the hook 5, serves to normally retain the jig hook 8 in its open position for catching fish.

A leader 19 is secured to the short link 16 and extends upwardly through a small hole 20 in the upper curved end 7 of the shank 6 which serves as a guide for said leader as will be readily understood. Said leader is ordinarily made of wire and may be attached directly to the fishing line or secured thereto by means of a swivel 21 as desired.

In its operative use the hook 5 is usually baited and the entire device is towed through the water. It will be observed that the device is wholly suspended from the leader 19 and its actuation is entirely governed thereby as clearly shown in the drawings.

When a fish strikes the bait hook 5 a pull is exerted through the leader 19 on the link 16 overcoming the tension of the spring 17 and pivotally drawing the links 11 and 13 upwardly as clearly shown in dotted lines in Fig. 1. By means of the pivot 12 the link 11 causes the jig hook 8 to turn on its axis 9 and its barbed point is snapped down and imbedded in the fish.

It will now be seen that in addition to being caught in the mouth by the hook 5 the fish is impaled by the jig hook 8 thus making his escape a practical impossibility.

Figure 3:
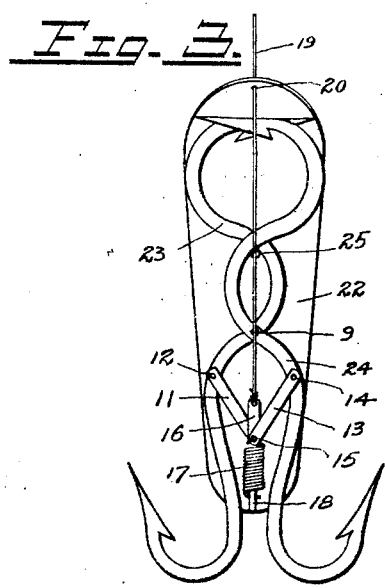
Fig. 3 is a view in side elevation of a modified form of the invention showing the position of the parts before the fish is caught.
Figure 4:
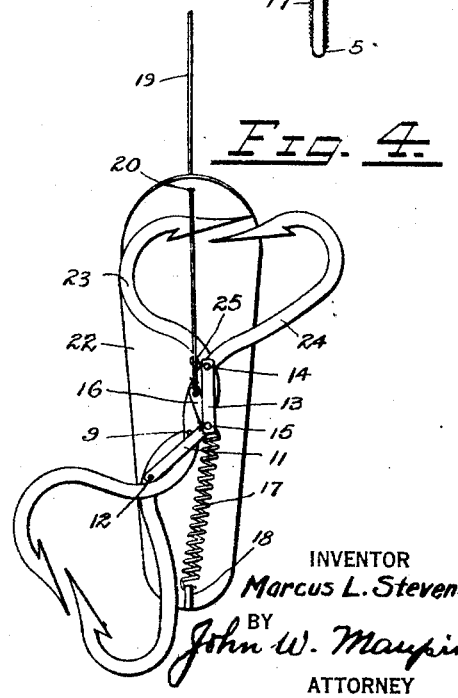
Fig. 4 is a similar view showing the disposition of the parts after the fish is caught.

In the modified form shown in Figs. 3 and 4 a spoon 22 may serve as a frame or support for the operative parts. Two similar doubly curved hooks 23 and 24 are hooked and barbed at both ends. They are assembled one over the other and pivotally secured together and to the spoon by the rivet 9. A pin 25 secured to the spoon may be used to normally retain the hooks in correct juxtaposition and prevent them from moving backward past the position shown in Fig. 3.

The modified form provides two bait hooks, as shown outstanding in Fig. 3, and otherwise its construction and operation are substantially the same as disclosed in the preferred embodiment. When a fish strikes one of the bait hooks the opposite barbed end of the other hook will be revolubly brought down upon him as indicated in Fig. 4.

While I have described my device with some particularity it will be understood that I intend no limitations except in so far as may be imposed by the appended claims and that such changes may be resorted to as are within the scope and spirit of the invention.

Having thus described my invention what I claim and desire to secure by Letters Patent of the United States is:—

1. A fishing tackle comprising a pair of hooks pivotally connected, a toggle system forming substantially a quadrilateral in pivotal connection with said hooks, and a leader pivotally secured to the free joint of said toggle and passing through a guide hole in the end of one of said hooks whereby the opposing points of the hooks are drawn together when a pull is exerted thereon.

2. A fishing tackle comprising a pair of hooks having their shanks pivotally connected, said shanks curved outwardly away from said pivotal connection, links pivotally connected together and to the curved portions of the shanks, and a leader pivotally secured at the point where the links are connected.

3. A fishing tackle comprising a bait hook having a relatively long shank, a relatively short jig hook pivotally connected to said bait hook, portions of said hooks curved outwardly away from said pivotal connection, corresponding flat links pivotally secured at their upper ends respectively to said outward curved portions, the lower ends of said links pivotally secured together, a short link pivotally interposed between the lower ends of said flat links, a leader secured to the free end of said short link, and the bait hook shank having a curved upper end portion with a hole through which the leader passes.

4. A fishing tackle comprising a pair of hooks pivotally connected, barbed points on said hooks, a toggle system pivotally joined to said hooks adjacent their pivotal connection, a stop adjacent said connection, a spring connected with said toggle arranged to normally hold said hooks in the open position, and a leader connected to said toggle adapted to close the opposing points of said hooks when a pull is exerted thereon.

MARCUS L. STEVENSON.